United States Patent [19]

Weingartner

[11] 4,228,439

[45] Oct. 14, 1980

[54] LEVEL AND FREQUENCY MEASURING RECORDER

[75] Inventor: Bernhard Weingartner, Feldkirch, Austria

[73] Assignee: Neutrik Aktiengesellschaft, Schaan, Liechtenstein

[21] Appl. No.: 938,638

[22] Filed: Aug. 31, 1978

[30] Foreign Application Priority Data

Sep. 5, 1977 [AT] Austria ............................ 6350/77

[51] Int. Cl.³ .............................................. G01D 9/38
[52] U.S. Cl. ................................ 346/33 R; 179/1 N;
324/77 CS; 346/76 R; 346/113; 346/136
[58] Field of Search ............. 346/33 R, 33 B, 33 ME,
346/32, 113, 65, 29, 76 R, 136; 324/77 C, 77
CS, 113; 179/1 N

[56] References Cited

U.S. PATENT DOCUMENTS

| 2,464,708 | 3/1949 | Moseley | 346/32 |
| 2,563,384 | 8/1951 | Bekesy | 179/1 N |
| 2,629,000 | 2/1953 | Olson | 324/77 C |
| 2,967,749 | 1/1961 | Strickler | 346/113 X |
| 3,908,641 | 9/1975 | Judson | 346/76 R X |

Primary Examiner—Joseph W. Hartary
Attorney, Agent, or Firm—Toren, McGeady and Stanger

[57] ABSTRACT

An audio-frequency generator applies signals to a unit under test. The output of the tested unit is applied selectively through either an amplifier having a linear or a logarithmic characteristic to a push-pull output stage driving a rotary coil measuring instrument. The latter drives a recording stylus. An electronically controlled paper drive is coupled to the wiper arm of a potentiometer. The voltage picked up by the wiper arm is applied to the audio-frequency generator to control the frequency thereof.

13 Claims, 3 Drawing Figures

LEVEL AND FREQUENCY MEASURING RECORDER

FIELD OF THE PRESENT INVENTION

The invention relates to a level and frequency response recorder including an audio-frequency generator and a recording stylus controlled by a test signal passed through a test amplifier as well as a paper feeding device driven by a motor.

BACKGROUND OF THE PRIOR ART

So-called recording measuring instruments or recorders are employed for graphic recording of a dependent variable as a function of an independent variable. Numerous types of such recorders have become known. A type frequently used particularly in electronics and electro-acoustics is the so-called level and frequency response recorder which permits recording of electrical and/or electro-acoustical values (levels) as functions of time and/or frequency. In the first case, there is obtained a so-called time-level diagram, for example, the variation of a sound level as a function of time; in the second case, a so-called frequency-characteristic (frequency response), as, for example, the variation with frequency of the sound pressure emitted by a loudspeaker. The recording of the tested value, the dependent variable, should be possible both on a linear as well as on a logarithmic scale, for example, in decibels (db), as is necessary, for example, in electro-acoustics because of the wide, required range of representation (1:1000). The X-axis in frequency response recorders is divided on a logarithmic scale also because three decade ranges of frequency (20 Hz to 20 kHz) must be recorded.

Level recorders known so far include, inter alia, a motor-operated paper feeding device and means for varying the feeding rate, also a usually electrodynamic device, based on the moving coil principle for linearily moving the recording stylus, and an electromechanical servo-system for achieving the desired logarithmic indication, and electric test amplifiers with rectifiers. Time diagrams can be recorded by means of such devices. When frequency characteristics are to be determined, there is additionally required a frequency generator having a mechanically adjustable, frequency-setting control element which is operated by the motor of the recorder synchronously with the paper feed by suitable means, for example, a flexible shaft, so that the corresponding generator frequency is associated with each position of the recording paper provided with frequency indicia. Because of the linear drive system employed and the servo control, these known test devices are very large and very expensive and were built heretofore only as non-portable laboratory testing devices. Recorder and audio frequency generator are separate test device units. Because of the servo control (control loop) and the servo potentiometers employed, these known testing devices have a relatively great tendency to instability, particularly at high recording rates and also low resolution. Only slow rates of paper movement and corresponding rates of frequency change are possible, therefore, with rapidly changing test signals. Since the servo-potentiometers are not of a continuous construction but are variable in steps only, their resolution is limted. The time constant of the control loop must be adapted to the time constant of the rectifier and to the rate of change of the signals. Otherwise great indication errors because of excessive or insufficient damping of the indication must be accepted, that is, the recording of the peaks and troughs in the frequency response curve is excessively high or unbalanced. The lower limiting frequency of the control loop also had to be adjusted according to the signal in order to avoid control oscillations at low frequencies. It is an additional shortcoming of these known devices that the synchronization of the audio frequency generator and recorder is time consuming and a change in the recording scale relatively complicated because it can be achieved only by replacing the very expensive measuring potentiometers. The measuring potentiometers are subject to mechanical wear whereby the accuracy of the indication is adversely affected.

SUMMARY OF THE PRESENT INVENTION

The invention shows a way of building an automatic, directly recording level and frequency response recorder which combines all necessary devices in a compact, readily portable housing, by novel combination and novel arrangement of elements and devices heretofore not considered suitable for the desired purpose. The invention is characterized in that the optionally amplified and rectified testing signal is received by a test amplifier unit having a linear and/or logarithmic transfer characteristic, whose output is connected with a rotary measuring instrument serving as a drive for the recording stylus, and that the output frequency of the audio-frequency generator is adjustable by means of a control element preferably constituted by a potentiometer which is connected directly or indirectly, preferably by a releasable coupling, with the drive for the paper feed.

BRIEF DESCRIPTION OF THE DRAWINGS

For an illustration of the invention, the same will be explained with reference to the appended drawing, wherein.

DESCRIPTION OF THE PREFERRED EMBODIMENTS

Figure 1:
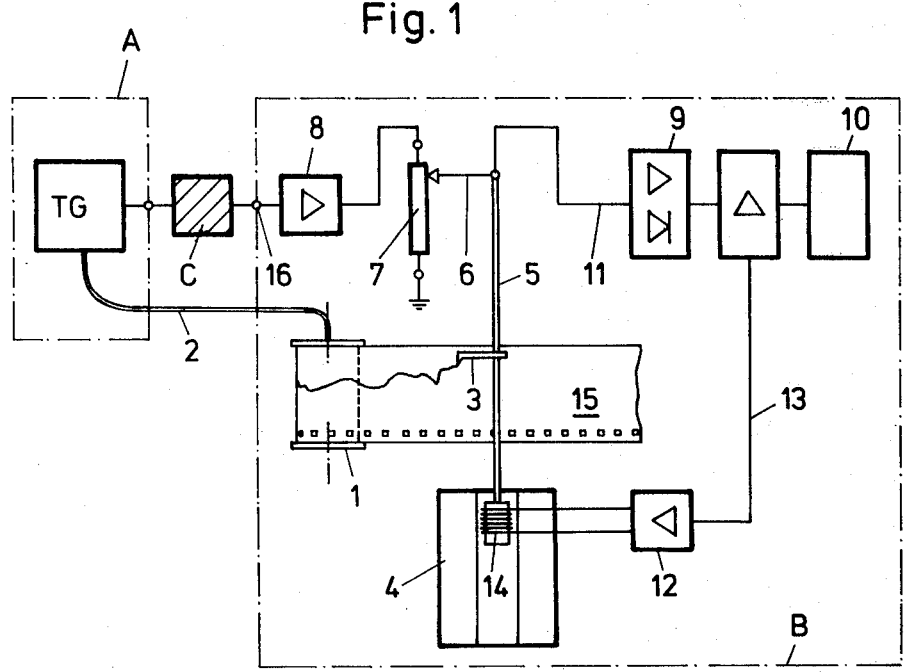
FIG. 1 is a block schematic of a frequency response recorder of conventional and known design.

Reference is had first to the block diagram of FIG. 1 which shows a measuring arrangement of conventional design for recording a frequency response. Such measuring arrangements, because of their large and weighty structure, can be employed only as fixed installations. The chain-dotted line A encloses the audio-frequency generator TG which constitutes a separate measuring device; the dotted line B encloses the recorder. The tested object is designated C. A motor-driven paper feeding device 1 in the recorder B is coupled mechanically during recording of a frequency response of a tested object C by a shaft 2, flexible by way of example, with the audio-frequency generator TG. The recording stylus 3 is driven by a linearily operating, moving coil measuring instrument, and the recording stylus or the linkage 5 carrying the same is connected with a sliding contact 6 engaging a replaceable potentiometer 7. An input amplifier 8 is arranged in circuit ahead of this measuring potentiometer. The signal tapped from the potentiometer is fed through a line 11 to an amplifier and rectifier 9. A source 10 of direct current is provided for generating a reference potential. The difference signal is transmitted to a direct-current amplifier 12 by a line 13. The direct-current amplifier 12 energizes the moving coil 14, whereby the recording stylus is moved linearily in accordance with the prevailing polarity. The sound pressure level, for example, is recorded as a function of time on the recording paper strip 15. The network represented here by the amplifier and rectifier 9 is generally switchable so that mean value, effective value, and peak value measurements are possible.

This known device operates as follows: The input potential to be recorded and occurring at the input terminal 16 is fed through the input amplifier to the measuring potentiometer 7 whose sliding contact 6 is coupled mechanically with the electrodynamic drive system 4. Coupling is achieved by means of the recording linkage 5 to which the recording stylus also is fastened. The measuring potentiometer 7 is an element of an automatic control loop. The signal potential tapped by the sliding contact 6 of the potentiometer 7 is amplified and rectified and is compared with a reference potential generated by the direct current source 10. The resulting difference potential controls the electrodynamic drive system and the sliding potentiometer contact 6 coupled thereto by way of the direct-current amplifier 12. The moving coil 14 is moved until the difference potential becomes equal to zero. Each change in the input potential acts on the control loop like a disturbance variable, which is compensated by a corresponding displacement of the potentiometer tap 6. The polarity of the difference potential determines the direction of movement. The magnitude of the measuring range, for example, 10, 25, 50 or 25 dB depends on the measuring potentiometer 7 which is being employed and which is exchangeable. When a logarithmic measuring potentiometer 7 is used, the position of the sliding contact 6 is proportional to the logarithm of the input voltage, that is, the potential level. The disadvantage of these known devices was explained in detail above.

Figure 2:
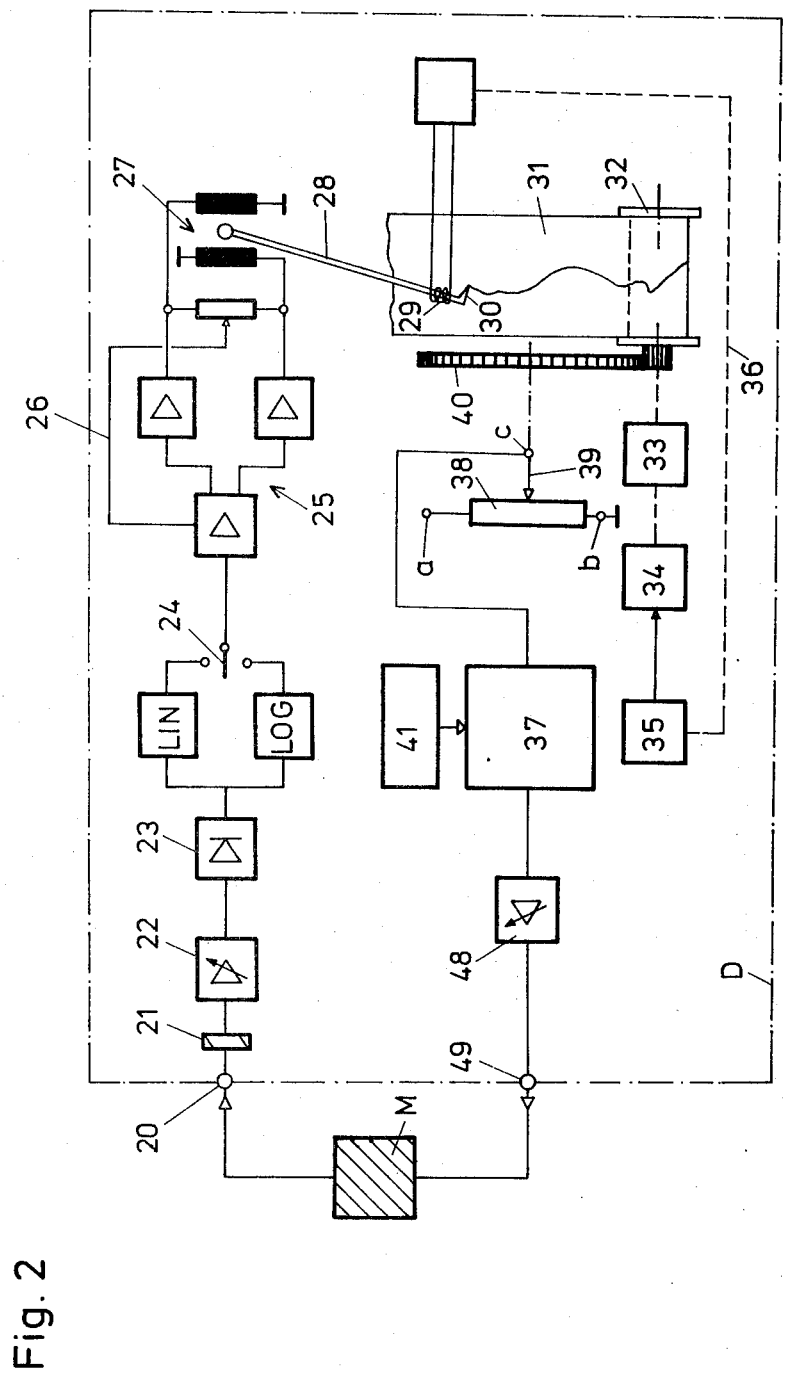
FIG. 2 is a block diagram of the frequency level and frequency response recorder of the invention.

FIG. 2 shows the basic design of a level and frequency response recorder according to the invention by means of a block diagram. All structural elements operative for recording and measurement are installed in the readily portable housing indicated by the chain-dotted line D. This housing may be equipped with a carrying handle and with shelves for receiving spare paper rolls, power cords, and testing accessories. All operating elements are arranged readily accessible at the top of the apparatus. More specifically, the following measuring instruments, switching elements, and the like are provided in this device: The input terminal 20 is followed by a multi-stage input divider 21, an amplifier 22, preferably stabilized, and a root-mean-square rectifier 23. The rectified test signal is fed to a linear amplifier LIN and a logarithmic amplifier LOG whose design over three decades (60 dB) is of substantial importance for the precision of the device. A selector switch 24 applies the output of the selected one of the two amplifiers to a push-pull output stage 25. The push-pull output stage 25 with electromechanical feedback 26 energizes the operating coil of a rotary measuring instrument 27. Suitable rotary measuring instruments are rotary-coil measuring instruments, rotary moving-iron instruments, and especially induction measuring instruments because the latter produce a relatively strong torque. The rotary measuring instrument 27 is connected with a pointer 28 equipped with a recording stylus 30 capable of being heated by means of a coil 29. The pointer 28 and the connected recording stylus are deflected proportionally to the input signal or the logarithm of the same. The rotary measuring instrument has a high recording velocity equal to or greater than 2000 mm/sec. The electromechanical feedback is preferably set in such a manner that the overshooting of the recording stylus 30 amounts at most to 5%.

The recording paper strip 31 is advanced by a cylinder 32 driven by a motor 34 and a transmission 33. The transmission causes a relatively great speed reduction (50-1) so as to permit operation by motors 34 having a relatively high nominal rotary speed. The paper advance is controlled electronically. The electronic control unit is designated by reference numeral 35. This unit also influences the heating of the recording stylus 30 as indicated by the broken line 36. The electronic control of the paper feed permits continuous variation of the paper speed from 0 to about 25 mm/sec. This is particularly useful when certain sections of the frequency scale are to be investigated in greater detail or when it is necessary to make measurements over an extended period. The temperature of the recording stylus 30 is controlled electronically so that the selected line width remains constant, independent of the recording velocity.

The housing D further accomodates an audio-frequency generator 37 whose controlling element, which sets the output frequency, consists of a rotary potentiometer 38, a slide contact 39, and a graduated disk 40 mounted on the shaft of the contact. The measuring potentiometer 38 is designed as a rotary potentiometer for a 360 degree angle of rotation and logarithmic characteristic, or as a rotary potentiometer followed by an antilogarithmic amplifier, the output function of the antilogarithmic amplifier constituting an exponential function of the input value. The audio-frequency generator can be modulated by an auxiliary attachment 41 for generating a broad excitation spectrum at low frequency wobble. The unit to be tested is designated M.

Figure 3:
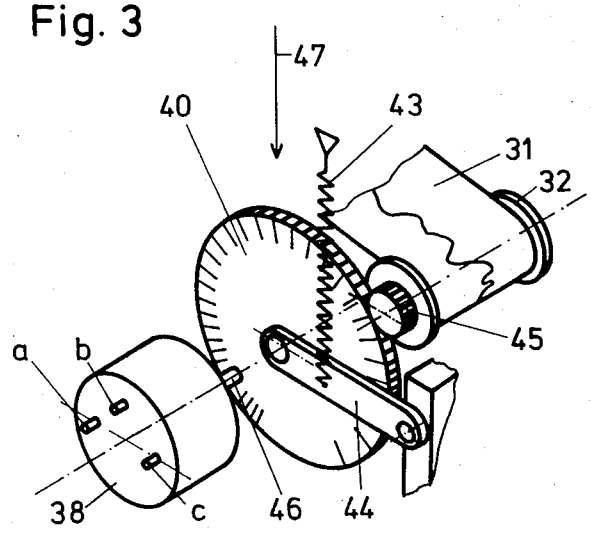
FIG. 3 shows a structural detail of the level and frequency response recorder of the invention.

The paper feeding cylinder 32 and the control element of the audio-frequency generator 37 are connected by a readily disengageable friction wheel coupling, the graduated disk 40 engaging a friction wheel 45 fixedly connected to the feeding cylinder 32 under the biasing force of a spring 43 (see detail drawing of FIG. 3). The rotary potentiometer 38 with its terminals a, b, c is fastened on an arm 44 which may be pivoted against the restraint of the spring 43 whereby the graduated disk 40 fastened on the control shaft 46 of the rotary potentiometer 38 is pressed against the friction wheel 45 of the transport cylinder 32. This friction coupling can be released by pressing the graduated disk in the direction of the arrow 47 (FIG. 3).

The frequency of the voltage-controlled audio-frequency generator is set by the rotary potentiometer connected with the graduated scale 40 over three logarithmic decades (20–20000 Hz). The graduated disk 40 is connected with the feeding cylinder 32 for the recording paper 31 by the afore-described releasable friction coupling so that each frequency printed on the recording paper corresponds to the set frequency of the audio-frequency generator 37, and the frequency response curves can be recorded automatically. The coupling is released by simply depressing the graduated disk 40 (arrow 47 in FIG. 3), and the generator frequency can be corrected or set manually, for example, for investigating more fully a particularly interesting range of frequencies. The output signal of audio-frequency signal generator 37 may be furnished by way of a direct power output or through a power amplifier 48 to the output terminal 49 so that direct measurements may be carried out on amplifiers, filters, loudspeakers, headphones, and similar electro-acoustic devices. The rotary potentiometer can be designed in such a manner that a reference frequency, for example, of 1 kHz is generated by the audio-frequency generator 37 and applied to the output 49 in the idle angle between maximum and minimum resistance values.

Another advantage of the direct-recording principle according to the invention resides in the fact that the time constant of the indication, which is responsible for the quasi-integration of the signal, is determined only by the time constant of the rectifier which may be selected freely within wide limits without regard for criteria of stability and/or hunting of a servo loop.

The level and frequency response recorder of the invention provides the practitioner for the first time with a device permitting him to record one of the most important test values of his activity at a cost of a normal measuring instrument such as an oscillograph or audio-frequency generator, whereas such measured values were available heretofore only with excessive expenditure of time or cost of apparatus. Carefully matched accessories, such as measuring microphone, artificial ear etc. permit measurements to be made on microphones, loudspeakers, and headphones and particularly on complete Hi-Fi and acoustic irradiation devices and installations. The recorder according to the invention is of compact structure, readily portable, and simple to operate, and includes all necessary devices for automatically recording frequency characteristics (frequency response curves) of electro-acoustic devices and systems on a logarithmic or linear scale.

I claim:

1. In apparatus for recording output signals furnished by a unit under test in response to input signals applied thereto, said apparatus having means for generating input signals having a frequency varying as a function of a frequency control signal, means for applying said input signals to said unit under test, record carrier means, transport means for transporting said record carrier means along a predetermined path and movable recording means for recording signals on said record carrier means, the improvement comprising:
    rotary measuring means connected to said movable recording means for driving said movable recording means in accordance with a drive signal applied to said rotary measuring means;
    first and second amplifier means having, respectively, a linear and a logarithmic transfer characteristic;
    selector means for selectively interconnecting one of said first and second amplifier means between said unit under test and said rotary measurement means so that the so-selected one of said amplifier means furnishes an amplified output signal constituting said drive signal; and
    control means coupled to said transport means for furnishing a position signal indicative of the position of said record carrier means relative to a starting position and for applying said position signal to said input signal generating means to constitute said frequency control signal,
    wherein said input signal generating means includes audio-frequency generator means; wherein said control means includes a potentiometer having a wiper arm and means for coupling the wiper arm to the transport means for movement therewith; and wherein said coupling means includes releasable coupling means.

2. Recording apparatus as set forth in claim 1, wherein said releasable coupling means comprises a friction wheel coupling.

3. Recording apparatus as set forth in claim 2, wherein said friction wheel coupling comprises a first wheel fixedly connected to said wiper arm of said potentiometer for rotation therewith.

4. Recording apparatus as set forth in claim 3, wherein said friction wheel coupling further comprises a swinging arm supporting said first wheel, a second wheel, and spring means for pressing said second wheel against said first wheel.

5. Recording apparatus as set forth in claim 4, wherein said first wheel has a circumference carrying a frequency scale.

6. In apparatus for recording output signals furnished by a unit under test in response to input signals applied thereto, said apparatus having means for generating input signals having a frequency varying as a function of a frequency control signal, means for applying said input signals to said unit under test, record carrier means, transport means for transporting said record carrier means along a predetermined path and movable recording means for recording signals on said record carrier means, the improvement comprising:
    rotary measuring means connected to said movable recording means for driving said movable recording means in accordance with a drive signal applied to said rotary measuring means;
    first and second amplifier means having, respectively, a linear and a logarithmic transfer characteristic;
    selector means for selectively interconnecting one of said first and second amplifier means between said unit under test and said rotary measurement means so that the so-selected one of said amplifier means furnishes an amplified output signal constituting said drive signal; and
    control means coupled to said transport means for furnishing a position signal indicative of the position of said record carrier means relative to a starting position and for applying said position signal to said input signal generating means to constitute said frequency control signal,
    wherein said rotary measuring means comprises a rotary measuring instrument and third amplifier means for driving said rotary measuring instrument;
    wherein movement of said measuring instrument induces a counter emf in said third amplifier means; and
    wherein said measuring means further comprises means for feeding back at least part of said counter emf to an input stage of said third amplifier means to constitute a feedback voltage.

7. In apparatus for recording output signals furnished by a unit under test in response to input signals applied thereto, said apparatus having means for generating input signals having a frequency varying as a function of a frequency control signal, means for applying said input signals to said unit under test, record carrier means, transport means for transporting said record carrier means along a predetermined path and movable recording means for recording signals on said record carrier means, the improvement comprising:

rotary measuring means connected to said movable recording means for driving said movable recording means in accordance with a drive signal applied to said rotary measuring means;

first and second amplifier means having, respectively, a linear and a logarithmic transfer characteristic;

selector means for selectively interconnecting one of said first and second amplifier means between said unit under test and said rotary measurement means so that the so-selected one of said amplifier means furnishes an amplified output signal constituting said drive signal; and control means coupled to said transport means for furnishing a position signal indicative of the position of said record carrier means relative to a starting position and for applying said position signal to said input signal generating means to constitute said frequency control signal, wherein said control means includes a substantially linear rotary potentiometer having a wiper arm and means for coupling the wiper arm to the transport means for movement therewith; wherein said input signal generating means includes a voltage controlled audio-frequency generator and wherein said frequency control signal is a frequency control voltage, said potentiometer having a logarithmic variation of resistance and an angle of rotation of 360°; and amplifier means connected to said linear rotary potentiometer for furnishing a frequency control signal varying as an exponential function of said position signal to said audio-frequency generator.

8. In apparatus for recording output signals furnished by a unit under test in response to input signals applied thereto, said apparatus having means for generating input signals having a frequency varying as a function of a frequency control signal, means for applying said input signals to said unit under test, record carrier means, transport means for transporting said record carrier means along a predetermined path and movable recording means for recording signals on said record carrier means, the improvement comprising:

rotary measuring means connected to said movable recording means for driving said movable recording means in accordance with a drive signal applied to said rotary measuring means;

first and second amplifier means having, respectively, a linear and a logarithmic transfer characteristic;

selector means for selectively interconnecting one of said first and second amplifier means between said unit under test and said rotary measurement means so that the so-selected one of said amplifier means furnishes an amplified output signal constituting said drive signal; and control means coupled to said transport means for furnishing a position signal indicative of the position of said record carrier means relative to a starting position and for applying said position signal to said input signal generating means to constitute said frequency control signal, wherein said input signal generator means includes audio-frequency generator means; wherein said control means includes a rotary potentiometer having a wiper arm and means for coupling the wiper arm to the transport means for movement therewith, said potentiometer of said control means having a logarithmic variation of resistance and an angle of rotation of 360°; wherein said rotary potentiometer has an idle angle; and wherein said audio-frequency generator means furnishes a reference frequency signal when said wiper arm of said rotary potentiometer is in said idle angle.

9. In apparatus for recording output signals furnished by a unit under test in response to input signals applied thereto, said apparatus having means for generating input signals having a frequency varying as a function of a frequency control signal, means for applying said input signals to said unit under test, record carrier means, transport means for transporting said record carrier means along a predetermined path and movable recording means for recording signals on said record carrier means, the improvement comprising:

rotary measuring means connected to said movable recording means for driving said movable recording means in accordance with a drive signal applied to said rotary measuring means;

first and second amplifier means having, respectively, a linear and a logarithmic transfer characteristic;

selector means for selectively interconnecting one of said first and second amplifier means between said unit under test and said rotary measurement means so that the so-selected one of said amplifier means furnishes an amplified output signal constituting said drive signal; and control means coupled to said transport means for furnishing a position signal indicative of the position of said record carrier means relative to a starting position and for applying said position signal to sid input signal generating means to constitute said frequency control signal, wherein said input signal generator means includes audio-frequency generator means; wherein said control means includes a rotary potentiometer having a wiper arm and means for coupling the wiper arm to the transport means for movement therewith, said potentiometer of said control means having a logarithmic variation of resistance and an angle of rotation of 360°; wherein said rotary potentiometer has an idle angle; wherein said audio-frequency generator means furnishes a reference frequency signal when said wiper arm of said rotary potentiometer is in said idle angle; and wherein said reference frequency signal is a signal having a frequency of 1 kHz.

10. In apparatus for recording output signals furnished by a unit under test in response to input signals applied thereto, said apparatus having means for generating input signals having a frequency varying as a function of a frequency control signal, means for applying said input signals to said unit under test, record carrier means, transport means for transporting said record carrier means along a predetermined path and movable recording means for recording signals on said record carrier means, the improvement comprising:

rotary measuring means connected to said movable recording means for driving said movable recording means in accordance with a drive signal applied to said rotary measuring means;

first and second amplifier means having, respectively, a linear and a logarithmic transfer characteristic;

selector means for selectively interconnecting one of said first and second amplifier means between said unit under test and said rotary measurement means so that the so-selected one of said amplifier means furnishes an amplified output signal constituting said drive signal; and control means coupled to said transport means for furnishing a position signal indicative of the position of said record carrier means relative to a starting position and for applying said position signal to said input signal generating means to constitute said frequency control signal, wherein said control means includes a substantially linear rotary potentiometer having a wiper arm and means for coupling the wiper arm to the transport means for movement therewith; wherein said input signal generating means includes a voltage controlled audio-frequency generator and wherein said frequency control signal is a frequency control voltage, said potentiometer having a logarithmic variation of resistance and an angle of variation of 360°; amplifier means connected to said linear rotary potentiometer for furnishing a frequency control signal varying as an exponential function of said position signal to said audio-frequency generator; and further includes means connected to said audio-frequency generator means for wobbling said audio-frequency signal.

11. In apparatus for recording output signals furnished by a unit under test in response to input signals applied thereto, said apparatus having means for generating input signals having a frequency varying as a function of a frequency control signal, means for applying said input signals to said unit under test, record carrier means, transport means for transporting said record carrier means along a predetermined path and movable recording means for recording signals on said record carrier means, the improvement comprising:

rotary measuring means connected to said movable recording means for driving said movable recording means in accordance with a drive signal applied to said rotary measuring means;

first and second amplifier means having, respectively, a linear and a logarithmic transfer characteristic;

selector means for selectively interconnecting one of said first and second amplifier means between said unit under test and said rotary measurement means so that the so-selected one of said amplifier means furnishes an amplified output signal constituting said drive signal; and control means coupled to said transport means for furnishing a position signal indicative of the position of said record carrier means relative to a starting position and for applying said position signal to said input signal generating means to constitute said frequency control signal, and wherein said movable recording means includes a recording stylus movable at a selected one of the plurality of recording speeds, said recording stylus includes an electrically heated resistance element; and further includes means for heating said resistance element in accordance with said selected one of said plurality of recording speeds.

12. In apparatus for recording output signals furnished by a unit under test in response to input signals applied thereto, said apparatus having means for generating input signals having a frequency varying as a function of a frequency control signal, means for applying said input signals to said unit under test, record carrier means, transport means for transporting said record carrier means along a predetermined path and movable recording means for recording signals on said record carrier means, the improvement comprising:

rotary measuring means connected to said movable recording means for driving said movable recording means in accordance with a drive signal applied to said rotary measuring means;

first and second amplifier means having, respectively, a linear and a logarithmic transfer characteristic;

selector means for selectively interconnecting one of said first and second amplifier means between said unit under test and said rotary measurement means so that the so-selected one of said amplifier means furnishes an amplified output signal constituting said drive signal; and control means coupled to said transport means for furnishing a position signal indicative of the position of said record carrier means relative to a starting position and for applying said position signal to said input signal generating means to constitute said frequency control signal, wherein said control means includes a substantially linear rotary potentiometer having a wiper arm and means for coupling the wiper arm to the transport means for movement therewith; wherein said input signal generating means includes a voltage controlled audio-frequency generator and wherein said frequency control signal is a frequency control voltage, said potentiometer having a logarithmic variation of resistance and an angle of rotation of 360°; amplifier means connected to said linear rotary potentiometer for furnishing a frequency control signal varying as an exponential function of said position signal to said audio-frequency generator; and wherein said releasable coupling means includes a function wheel coupling, said coupling having a first wheel fixedly connected to said wiper arm of said potentiometer for rotation therewith, a swinging arm supporting the first wheel, a second wheel, and spring means for pressing said second wheel against said first wheel and wherein the first wheel has a circumference carrying a frequency scale.

13. In apparatus for recording output signals furnished by a unit under test in response to input signals applied thereto, said apparatus having means for generating input signals having a frequency varying as a function of a frequency control signal, means for applying said input signals to said unit under test, record carrier means, transport means for transporting said record carrier means along a predetermined path and movable recording means for recording signals on said record carrier means, the improvement comprising:

rotary measuring means connected to said movable recording means for driving said movable recording means in accordance with a drive signal applied to said rotary measuring means;

first and second amplifier means having, respectively, a linear and a logarithmic transfer characteristic;

selector means for selectively interconnecting one of said first and second amplifier means between said unit under test and said rotary measurement means so that the so-selected one of said amplifier means furnishes an amplified output signal constituting said drive signal; and control means coupled to said transport means for furnishing a position signal indicative of the position of said record carrier means relative to a starting position and for applying said position signal to said input signal generating means to constitute said frequency control signal, wherein said control means includes a substantially linear rotary potentiometer having a wiper arm and means for coupling the wiper arm to the transport means for movement therewith; wherein said input signal generating means includes a voltage controlled audio-frequency generator and wherein said frequency control signal is a frequency control voltage, said potentiometer having a logarithmic variation of resistance and an angle of variation of 360°; amplifier means connected to said linear rotary potentiometer for furnishing a frequency control signal varying as an exponential function of said position signal to said audio-frequency generator; further includes means connected to said audio-frequency generator means for wobbling said audio-frequency signal; and wherein said releasable coupling means includes a function wheel coupling, said coupling having a first wheel fixedly connected to said wiper arm of said potentiometer for rotation therewith, a swinging arm supporting the first wheel, a second wheel, and spring means for pressing said second wheel against said first wheel and wherein the first wheel has a circumference carrying a frequency scale.

* * * * *